United States Patent
Kisumi (10) Patent No.: US 9,842,698 B2
(45) Date of Patent: Dec. 12, 2017

(54) MULTILAYER CERAMIC CAPACITOR AND MANUFACTURING METHOD THEREFOR

(71) Applicant: Murata Manufacturing Co., Ltd., Nagaokakyo-shi, Kyoto-fu (JP)

(72) Inventor: Tetsuya Kisumi, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 106 days.

(21) Appl. No.: 14/919,044

(22) Filed: Oct. 21, 2015

(65) Prior Publication Data
US 2016/0042867 A1    Feb. 11, 2016

Related U.S. Application Data (63) Continuation of application No. PCT/JP2014/059847, filed on Apr. 3, 2014.

(30) Foreign Application Priority Data

Apr. 25, 2013    (JP) ................................ 2013-092139

(51) Int. Cl.
*H01G 4/232*    (2006.01)
*H01G 4/30*    (2006.01)
(Continued)

(52) U.S. Cl.
CPC ......... *H01G 4/2325* (2013.01); *H01G 4/0085* (2013.01); *H01G 4/012* (2013.01);
(Continued)

(58) Field of Classification Search
CPC .......... H01G 4/30; H01G 4/232; H01G 4/005; H01G 4/2325; H01G 4/248
See application file for complete search history.

(56) References Cited

U.S. PATENT DOCUMENTS

2002/0096663 A1    7/2002    Sato et al.
2004/0147653 A1*   7/2004    Konno .................... H01G 4/30
                                                         524/401
(Continued)

FOREIGN PATENT DOCUMENTS

JP    H09-55118 A      2/1997
JP    2001-274035 A    10/2001
(Continued)

OTHER PUBLICATIONS

English language Machine Translation of JP 2008-130720.*
(Continued)

*Primary Examiner* — Dion R Ferguson
(74) *Attorney, Agent, or Firm* — Arent Fox LLP (57) ABSTRACT

A multilayer ceramic capacitor having a multilayer ceramic element with internal electrodes opposed to each other and dielectric ceramic layers interposed therebetween, and external electrodes on a surface of the multilayer ceramic element and electrically connected to the internal electrodes. The external electrodes contain a first non-precious metal as a first conductive component, and glass containing BaO and/or SrO, where a total content of the BaO and/or the SrO is 34 mol % or more. The internal electrodes have a second non-precious metal different from the first non-precious metal included in the external electrodes. A glass layer is formed at interfacial parts between the ceramic layers and the external electrodes, and a diffusion length thereof is within a range of 1 μm to 5 μm from joint interfaces between the external electrodes and the internal electrodes at the joints.

12 Claims, 3 Drawing Sheets

(51) Int. Cl.
*H01G 4/12* (2006.01)
*H01G 4/008* (2006.01)
*H01G 4/012* (2006.01)
*H01G 4/248* (2006.01)

(52) U.S. Cl.
CPC ............... *H01G 4/12* (2013.01); *H01G 4/248* (2013.01); *H01G 4/30* (2013.01)

(56) References Cited

U.S. PATENT DOCUMENTS

| | | | |
|---|---|---|---|
| 2011/0149471 A1* | 6/2011 | Hur | H01G 4/12 361/321.2 |
| 2014/0177134 A1* | 6/2014 | Awata | H01G 4/1236 361/321.5 |
| 2016/0196920 A1* | 7/2016 | Koga | H01G 4/30 361/301.1 |

FOREIGN PATENT DOCUMENTS

| | | | | |
|---|---|---|---|---|
| JP | 2002-025337 A | | 1/2002 | |
| JP | 2003-077336 A | | 3/2003 | |
| JP | 2003-243246 A | | 8/2003 | |
| JP | 2006-013219 A | | 1/2006 | |
| JP | 2006-246659 A | | 9/2006 | |
| JP | 2008-130720 | * | 5/2008 | ............... H01G 4/12 |
| JP | 2012-109488 A | | 6/2012 | |
| WO | WO 2015045721 | * | 5/2015 | ............. H01G 4/232 |

OTHER PUBLICATIONS

International Search Report issued for PCT/JP2014/059847, dated Jul. 8, 2014.
Written Opinion of the International Searching Authority issued for PCT/JP2014/059847, dated Jul. 8, 2014.

* cited by examiner

MULTILAYER CERAMIC CAPACITOR AND MANUFACTURING METHOD THEREFOR

CROSS REFERENCE TO RELATED APPLICATIONS

The present application is a continuation of International application No. PCT/JP2014/059847, filed Apr. 3, 2014, which claims priority to Japanese Patent Application No. 2013-092139, filed Apr. 25, 2013, the entire contents of each of which are incorporated herein by reference.

FIELD OF THE INVENTION

The present invention relates to a ceramic capacitor and a method for manufacturing the capacitor, and more particularly, to a multilayer ceramic capacitor including: a multilayer ceramic element structured to have internal electrodes provided so as to be opposed to each other with ceramic layers as dielectric layers interposed therebetween; and external electrodes provided on the surface of the multilayer ceramic element so as to be electrically connected to the internal electrodes, and a method for manufacturing the capacitor.

BACKGROUND OF THE INVENTION

Figure 6:
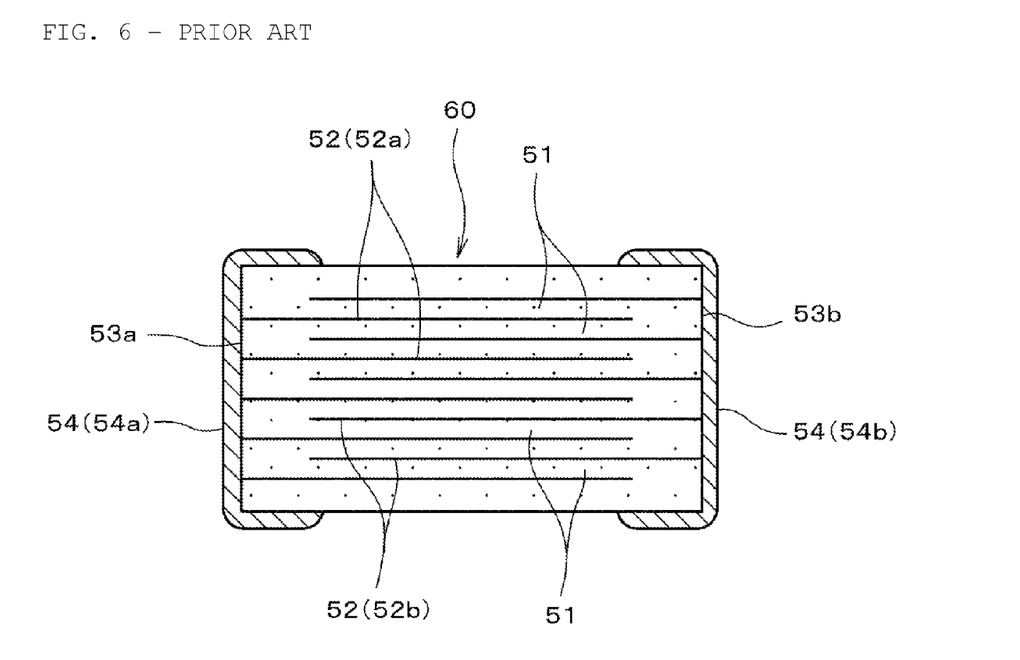
FIG. 6 is a diagram illustrating the configuration of a common multilayer ceramic capacitor.

In recent years, with the reduction in size and weight for electronic devices, multilayer ceramic capacitors have been widely used which are small in size and capable of achieving high capacitance. This multilayer ceramic capacitor is, for example, as shown in FIG. 6, structured to have external electrodes 54 (54a, 54b) provided, so as to be electrically connected to a plurality of internal electrodes (52a, 52b), on a pair of mutually opposed end surfaces 53 (53a, 53b) of a multilayer ceramic element (ceramic laminated body) 60 obtained by laminating the internal electrodes 52 (52a, 52b) with ceramic layers 51 as dielectric layers interposed therebetween.

Further, in such a multilayer ceramic capacitor, a method of forming external electrodes by applying and baking a conductive paste including a conductive component such as a metal powder, a glass powder, and a vehicle is widely used as a method for forming the external electrodes.

As one of such methods, a method is proposed in which external electrode are formed on the surface of an electronic component element (multilayer ceramic element) or the like by firing at a firing temperature of 600 to 670° C. with the use of a conductive paste containing, in glass frit, $B_2O_3$: 9.0 to 20.0 weight %, $SiO_2$: 22.0 to 32.0 weight %, BaO: 35.0 to 45.0 weight %, ZnO: 0.1 to 30.0 weight %, $Al_2O_3$: 0.1 to 12.0 weight %, $Na_2O$: 0.1 to 15.0 weight % in terms of oxide (see Patent Document 1).

Further, when external electrodes are adapted to be formed by the method in Patent Document 1, defect generation caused by melting of internal electrodes (silver) provided in an electronic component element (multilayer ceramic element) is supposed to be allowed to be suppressed, and external electrodes which have adequate adhesive strength to adhere to the electronic component element are supposed to be able to be obtained (paragraph 0046 in Patent Document 1).

However, in the case of the conventional method, as described in an example thereof, firing in an air atmosphere is presupposed. For example, in the case of an electronic component with a non-precious metal of nickel (Ni) as internal electrodes and copper (Cu) as external electrodes, when firing in a neutral to reducing atmosphere is adapted to be applied because there is a need to prevent the electrodes form being oxidized, firing at a low temperature of, for example, 600 to 670° C. as disclosed in Patent Document 1 has the problem of insufficient degreasing, thereby resulting in failure to achieve densification of the external electrodes.

Alternatively, in the case of firing at high temperature, densification becomes possible, but there is a problem of eluting the internal electrodes into glass and interfering with contact with the external electrodes when glass contained in the external electrodes is not appropriate.

In contrast, when the internal electrodes are exposed adequately from the multilayer ceramic element in order to ensure the contact between the internal electrodes and the external electrodes, there is a problem that excessive interdiffusion between the metal constituting the external electrodes and the metal constituting the internal electrodes expands the internal electrodes to crack the ceramic constituting the multilayer ceramic element, thereby decreasing the mechanical strength and moisture resistance reliability.

Patent Document 1: Japanese Patent No. 3534684

SUMMARY OF THE INVENTION

The present invention is intended to solve the problems mentioned above, and an object of the invention is to provide a multilayer ceramic capacitor which makes it possible to ensure contact between an internal electrode and an external electrode, and keep or prevent a ceramic constituting a multilayer ceramic element from being cracked due to metal diffusion from the external electrode to the internal electrode, even when non-precious metals are used for the internal electrode and the external electrode, and a method for manufacturing the capacitor.

In order to solve the problems mentioned above, the multilayer ceramic capacitor according to the present invention is a multilayer ceramic capacitor including a multilayer ceramic element having internal electrodes opposed to each other with dielectric ceramic layers interposed therebetween; and external electrodes provided on a surface of the multilayer ceramic element and electrically connected to the internal electrodes.

The external electrodes contain a first non-precious metal as a first conductive component; and glass containing either one or both of BaO and SrO, and the total content of the BaO and the SrO is 34 mol % or more.

The internal electrodes contain, as a second conductive component, a second non-precious metal different from the first non-precious metal included in the external electrodes.

A glass layer is formed at the interfaces between the dielectric ceramic layers of the multilayer ceramic element and the external electrodes.

The first non-precious metal of the external electrodes diffuses into the internal electrodes at the joints between the external electrodes and the internal electrodes, and the diffusion length falls within the range of 1 to 5 μm from the joint interfaces between the external electrodes and the internal electrodes.

In addition, in the multilayer ceramic capacitor according to the present invention, the glass included in the external electrodes preferably contains $SiO_2$ in the range of 42 to 47 mol %.

Meeting the requirements mentioned above makes it possible to achieve a more highly reliable multilayer ceramic capacitor including external electrodes which has more remarkable plating resistance, and has high moisture resistance even when layer thickness is reduced.

The method for manufacturing a multilayer ceramic capacitor according to the present invention includes forming external electrodes from a conductive paste containing: (a) a first non-precious metal powder of 1.0 to 3.8 μm in average particle size; and (b) a glass powder containing either one or both of BaO and SrO, where the total content of the BaO and the SrO is 34 mol % or more, and firing at 700 to 850° C.

The multilayer ceramic capacitor according to the present invention meets the following requirements: (a) the external electrodes contain: the first non-precious metal as a first conductive component; and the glass containing either one or both of BaO and SrO, the total content thereof being 34 mol % or more, (b) the internal electrodes contain, as a second conductive component, a second non-precious metal different from the first non-precious metal included in the external electrodes, (c) a glass layer is formed at interfacial parts between the dielectric ceramic layers of the multilayer ceramic element and the external electrodes, and (d) the first non-precious metal of the external electrodes diffuses into the internal electrodes, and the diffusion length falls within the range of 1 to 5 μm from the joint interfaces between the external electrodes and the internal electrodes. Thus, it becomes possible to provide a multilayer ceramic capacitor which makes it possible to ensure the contact between the internal electrode and the external electrode, and suppress crack generation due to metal diffusion from the external electrodes to the internal electrodes, even when the non-precious metals are used for the internal electrodes and the external electrodes.

Further, in order to improve moisture resistance reliability, it is also conceivable that a method is adopted which suppresses or prevents ingress of plating solutions and moisture into the multilayer ceramic element in a way that a glass layer is formed at the interface between the multilayer ceramic element and the external electrodes in the foregoing method for manufacturing an electronic component in Patent Document 1. However, in fact, when the composition of glass for use in the conductive paste is inappropriate, the joints between the external electrodes and the internal electrodes are dissolved in the glass layer in the firing process, thereby failing to adequately ensure the contact between the external electrodes and the internal electrodes.

Under such circumstances, the present invention has been achieved by finding that the glass containing 34 mol % or more in total of either one or both of BaO and SrO has low reactivity with the ceramic or the metals, thereby making the joint interface (joint) between the internal electrode and the external electrode less likely to be dissolved in the glass around the interface, and further carrying out studies, and the use of the glass makes it possible to achieve contact between the external electrode and the internal electrode while forming a glass layer (interfacial glass layer) at the interface between the external electrode and the ceramic.

In addition, the diffusion length of the non-precious metal constituting the external electrodes to the internal electrode falls within the range of 1 to 5 μm from the joint interface between the external electrode and the internal electrode, thereby making it possible to reliably keep or prevent the ceramic from being cracked by the internal electrodes expanded due to metal diffusion, while ensuring contact rigidity.

Furthermore, in the method for manufacturing a multilayer ceramic capacitor according to the present invention, the external electrodes are formed from the conductive paste containing: the first non-precious metal as a first conductive component; and the glass powder containing either one or both of BaO and SrO, where the total content thereof is 34 mol %, and fired at 700 to 850° C. Thus, the multilayer ceramic capacitor according to the present invention, which produces the function effects as described above, can be manufactured efficiently.

DETAILED DESCRIPTION OF THE INVENTION

With reference to an embodiment of the present invention, features of the present invention will be described in detail below.

Embodiment 1

Preparation of Multilayer Ceramic Capacitor (1) Preparation of Ceramic Green Sheet For preparing a multilayer ceramic capacitor, first, a ceramic raw material powder mainly containing a barium titanate was, with the addition of a well known organic binder and organic solvent to the powder, subjected to wet mixing with a ball mill to prepare ceramic raw material slurry.

Then, the ceramic raw material slurry was formed into sheets by a doctor blade method, thereby preparing ceramic green sheets.

(2) Preparation of Conductive Paste for Formation of Internal Electrode

A Ni powder as a conductive component, and for example, terpineol and an acrylic varnish were mixed and dispersed to prepare a conductive paste for the formation of internal electrodes.

(3) Preparation of Conductive Paste for Formation of External Electrode (3-1) Preparation of Glass Powder For preparing a conductive paste for the formation of external electrodes, first multiple types of glass powders of different compositions, that is, five types of glass powders in total from a glass powder 1 to a glass powder 5 in Table 1 were prepared.

In this embodiment, the glass powders for use in evaluation were subjected to a composition analysis with WD-XRF (wavelength dispersive X-ray fluorescence spectrometer) to determine the quantities of light elements from fluorine to heavy elements. It is to be noted that the proportions of $SiO_2$, SrO, BaO, etc. in the glass powder constituting the conductive paste refer to values obtained by this analysis method in the present invention.

Table 1 shows values for $SiO_2$, SrO, BaO, $Al_2O_3$, CaO, ZnO, $Na_2O$, and CuO, contained in each glass powder, and the total of BaO+SrO, which were obtained from the results of the WD-XRF.

TABLE 1

| Type of Glass Powder | Glass Powder Composition (mol %) | | | | | | | | Total of BaO + SrO (mol %) |
|---|---|---|---|---|---|---|---|---|---|
| | $SiO_2$ | SrO | BaO | $Al_2O_3$ | CaO | ZnO | $Na_2O$ | CuO | |
| Glass Powder 1 (B—Z—Ba System) | 13 | — | 40 | 9 | 10 | 28 | — | — | 40 |
| Glass Powder 2* (Si—B—Ba System-1) | 45 | — | 16 | 4 | 1 | 19 | 8 | 7 | 16 |
| Glass Powder 3 (Si—B—Ba System-2) | 46 | — | 34 | 6 | — | 6 | 6 | — | 34 |
| Glass Powder 4 (Si—B—Sr System) | 46 | 34 | — | 6 | — | 6 | 6 | — | 34 |
| Glass Powder 5 (Si—B—Ba—Sr System) | 42 | 19 | 19 | 2 | 5 | — | 11 | 2 | 38 |

*Glass Powder 2 is a glass powder which fails to meet the requirements of the present invention

(3-2) Preparation of Cu Powder as Conductive Component

As a conductive component of the conductive paste for the formation of external electrodes, Cu powders of differing average particle sizes were prepared as shown in Table 2. The average particle sizes of the Cu powder have values measured by a Microtrac method.

It is to be noted that the average particle size of a non-precious metal powder constituting the conductive paste in the present invention refers to a value measured by a Microtrac method.

(3-3) Preparation of Conductive Paste

Figure 2:
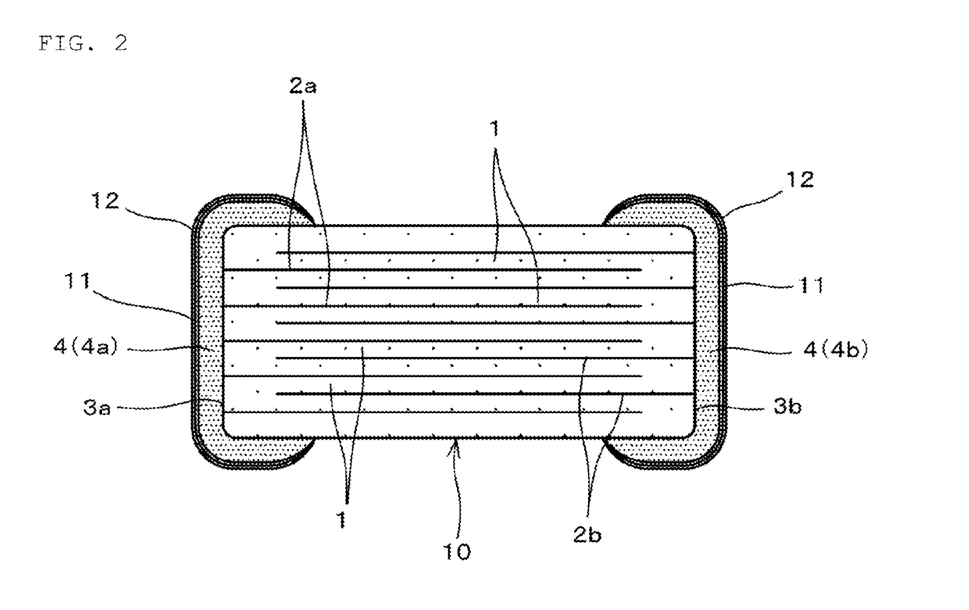
FIG. 2 is a front cross-sectional view of a multilayer ceramic capacitor according to an embodiment of the present invention.

The five types of glass powders of glass powder 1 to glass powder 5 (see Table 1) shown in Table 1 and the Cu powders differing in the average particle size measured by the Microtrac method (see Table 2) were mixed with an acrylic varnish with terpineol as a solvent, and dispersed with a triple roll mill to prepare nine types of conductive pastes (conductive pastes A to I) for the formation of external electrodes as shown in FIG. 2.

(4) Preparation of Multilayer Ceramic Capacitor

(4-1) Formation of Internal Electrode Pattern on Ceramic Green Sheet

The internal electrode paste containing the Ni powder as a conductive component, prepared in the way described above, was applied by a screen printing method onto the ceramic green sheets prepared in the way described above to form a number of internal electrode patterns.

(4-2) Stacking of Mother Ceramic Green Sheets

Next, among the ceramic green sheets provided with the internal electrode patterns (=internal electrode sheets) formed in the way described above, a predetermined number of sheets were stacked in such a manner that internal electrodes were extended alternately to one side surface and the other of a pair of end surfaces opposed to each other for each individual element, in the case of being finally cut to be divided into individual elements (unfired multilayer ceramic elements).

Then, a predetermined number of ceramic green sheets for outer layers (=outer layer sheets) without any internal electrode formed were further stacked on both upper and lower sides of the stacked body obtained, thereby preparing a stacked body of mother ceramic green sheets.

In this regard, from the perspective of achieving a multilayer ceramic capacitor which is small in size and high in electrostatic capacitance, it is desirable to design so as to increase the number of the internal electrode sheets stacked, and reduce the number of the outer layer sheets stacked to the extent that any particular problem is not caused.

TABLE 2

| Conductive Paste for External Formation | Average Particle Size of Cu Powder | Type of Glass Powder | SrO + BaO in Glass Powder (mol %) | Cu Powder in Conductive Paste (vol %) | Amount of Glass Powder (vol %) | Amount of Acrylic Varnish (vol %) |
|---|---|---|---|---|---|---|
| A* | 0.6 μm | Glass Powder 1 | 40 | 22.4 | 5.6 | 72 |
| B | 1.0 μm | Glass Powder 1 | 40 | 22.4 | 5.6 | 72 |
| C | 1.8 μm | Glass Powder 1 | 40 | 22.4 | 5.6 | 72 |
| D | 3.8 μm | Glass Powder 1 | 40 | 22.4 | 5.6 | 72 |
| E* | 4.6 μm | Glass Powder 1 | 40 | 22.4 | 5.6 | 72 |
| F* | 3.8 μm | Glass Powder 2 | 16 | 22.4 | 5.6 | 72 |
| G | 3.8 μm | Glass Powder 3 | 34 | 22.4 | 5.6 | 72 |
| H | 3.8 μm | Glass Powder 4 | 34 | 22.4 | 5.6 | 72 |
| I | 3.8 μm | Glass Powder 5 | 38 | 22.4 | 5.6 | 72 |

*Conductive Paste A, E, F are conductive pastes which fail to meet the requirements of the present invention

(4-3) Pressure Bonding, Division, and Firing of Stacked Body of Mother Ceramic Green Sheets Then, the stacked body of mother ceramic green sheets prepared in the way described above was subjected to pressure bonding in the stacking direction through means such as isostatic press, and then cut in predetermined positions to obtain unfired multilayer ceramic elements (individual multilayer ceramic capacitors) in the form of chips.

The unfired multilayer ceramic elements were subjected to firing at 1050° C. to sintered laminated bodies (multilayer ceramic elements 10 (see FIGS. 1 and 2)) in the form of chips.

The dimensions of the sintered laminated body (multilayer ceramic element) were width W: 1200 μm, thickness T: 1200 μm, and length L 2000 μm, and the outer layer thickness was 30 to 50 μm.

(4-4) Formation of External Electrode

Then, the conductive paste for the formation of external electrodes, prepared in the way described above, was applied by a dip coating method to mutually opposed end surfaces with the internal electrode extended thereto, of the multilayer ceramic element with the Ni internal electrodes, obtained in the way described above.

Then, after drying for 10 minutes at 150° C., firing was carried out with the peak top temperature varied to 650, 700, 750, 800, 850, and 900° C. under a $N_2$ atmosphere, thereby forming external electrodes.

Next, Ni plating film layers were formed by electrolytic plating on the surfaces of the external electrodes formed, and Sn plating film layers were further formed on the Ni plating film layers. Thus, a multilayer ceramic capacitor was obtained as shown in FIGS. 1 and 2.

Figure 1:
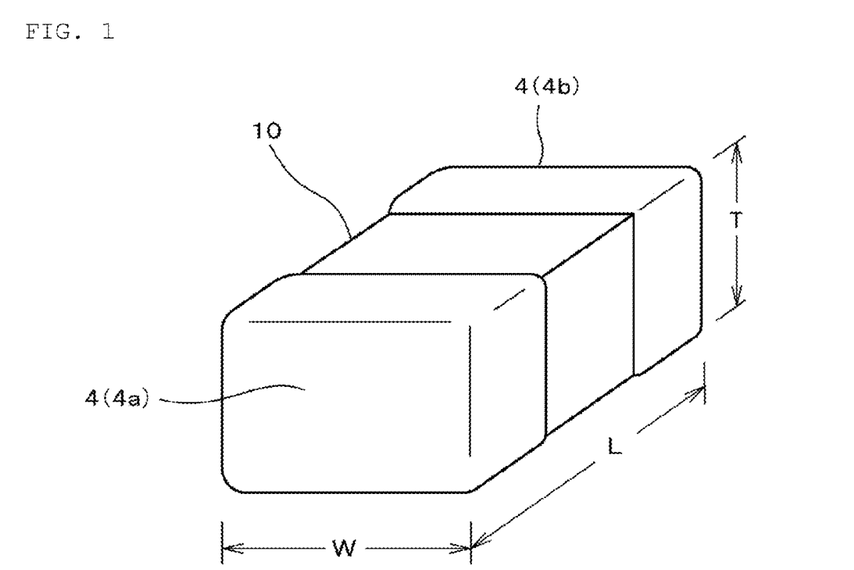
FIG. 1 is a perspective view of a multilayer ceramic capacitor according to an embodiment of the present invention.

This multilayer ceramic capacitor is structured, as shown in FIGS. 1 and 2, to have external electrodes 4 (4a, 4b) provided, so as to be electrically connected to a plurality of internal electrodes 2 (2a, 2b), on a pair of mutually opposed end surfaces 3 (3a, 3b) of the multilayer ceramic element 10 with the internal electrodes 2 laminated with ceramic layers 1 as dielectric layers interposed therebetween, and have Ni plating film layers 11 and Sn plating film layers 12 sequentially formed on the surfaces of the external electrodes 4 (4a, 4b).

Evaluation of Characteristics

For the multilayer ceramic capacitor prepared in the way described above, electrostatic capacitance and moisture resistance were examined by the methods described below.

Furthermore, WDX mapping and SEM observations were used to examine the glass composition in the external electrode, whether a glass layer (interfacial glass layer) was formed or not at the interface between the external electrode and the ceramic, the diffusion length (metal diffusion length) of the non-precious metal (Cu) constituting the external electrode to the internal electrode (Ni) at the joint interface between the external electrode and the internal electrode, and whether the ceramic body was cracked or not.

(1) Electrostatic Capacitance

For the multilayer ceramic capacitor prepared in the way described above, the electrostatic capacitance was measured to check whether specified capacitance was fulfilled. The electrostatic capacitance was measured with an LCR meter, and the capacitor with 95% or less of the specified electrostatic capacitance was determined to be defective (×).

(2) Moisture Resistance

In addition, with a rated voltage applied, a moisture resistance test was carried out under the conditions of humidity: 95%, temperature: 125° C., and test time: 72 hours to check whether the insulation resistance was decreased or not after the test, and check whether the moisture was defective or not.

It is to be noted that as for whether the moisture resistance was defective or not, the sample with the insulation resistance of $1.0 \times 10^7 \Omega$ or higher was determined to have non-defective moisture resistance (○), whereas the sample with the insulation resistance of less than $1.0 \times 10^7 \Omega$ was determined to be defective (×).

(3) Evaluation of Characteristics Through WDX Mapping and SEM Observation

In addition, WDX mapping excluding B (boron) or lighter elements and SEM observations were used to observe:

(a) the glass composition in the external electrode;

(b) whether a glass layer was formed or not at the interface between the external electrode and the ceramic;

(c) the diffusion length (metal diffusion length) of the non-precious metal (Cu) constituting the external electrode to the internal electrode (Ni) at the joint between the external electrode and the internal electrode; and (d) whether the multilayer ceramic was cracked or not.

Figure 3:
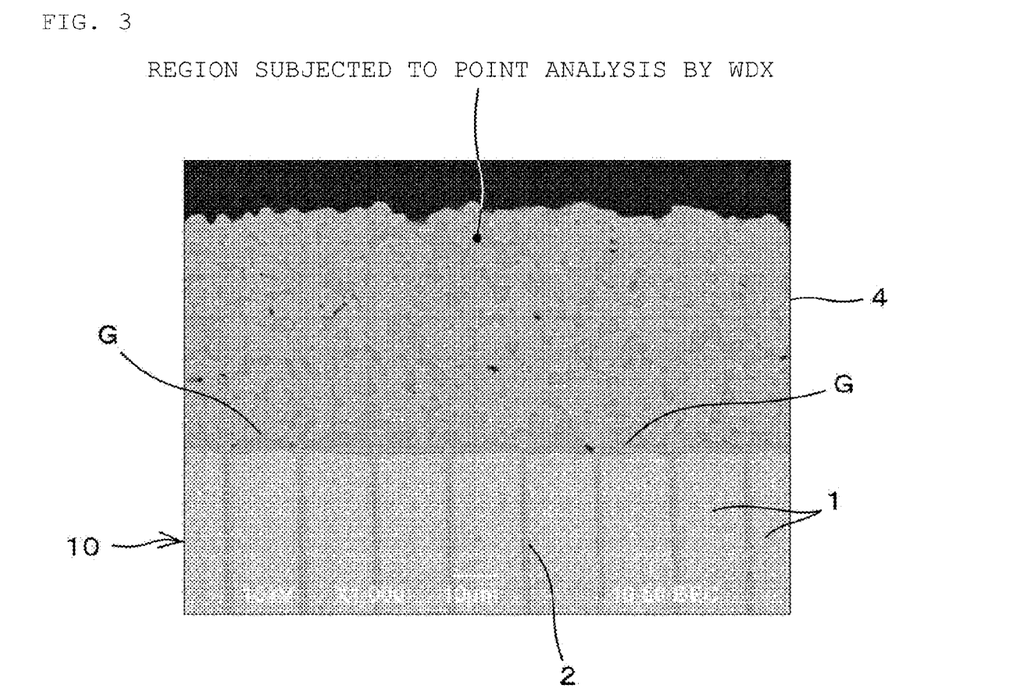
FIG. 3 is a diagram showing a location subjected to an analysis of glass in an external electrode by WDX, at a polished end surface of a multilayer ceramic capacitor that meets the requirements of the present invention, and a diagram showing that a continuous glass layer with fewer voids is formed at the interface between the external electrode and a ceramic layer.

Specifically, as for the (a) glass composition, the surface (surface LT) defined by a length direction (direction L) and a thickness direction (direction T) in FIGS. 1 and 2 was polished in a width direction (direction W) down to ½ of the width dimension (dimension W), glass in a surface layer part of the external electrode 4 at the polished end surface was subjected to a point analysis by WDX, and the average value for n=5 was calculated to confirm the glass composition (see FIG. 3).

It is to be noted that the composition of the glass constituting the external electrode in the present invention refers to a glass composition confirmed by the method mentioned above.

In addition, with the same samples, attention was focused on the interface between the external electrode 4 and the ceramic (ceramic layer) 1 to determine whether a continuous glass layer G (interfacial glass layer) with fewer voids was formed or not. It is to be noted that FIG. 3 illustrates a multilayer ceramic electronic component that meets the requirements of the present invention, where a continuous glass layer G (interfacial glass layer) with fewer voids is formed at the interface between the external electrode 4 and the ceramic layer 1.

Furthermore, the diffusion length of the non-precious metal (Cu) constituting the external electrode to the internal electrode (Ni) (Cu→Ni diffusion length) was also examined with the use of the same samples. More specifically, in regard to the interface between the external electrode 4 and the ceramic (ceramic layer) 1, WDX mapping images for Cu and Ni were acquired at a 3000-fold magnification, the diffusion length (Cu→Ni diffusion length) of Cu from an end of the internal electrode inward into the element (multilayer ceramic element) 10 (in a direction perpendicular to the longitudinal direction of the internal electrode) was measured for all of the internal electrodes (Ni internal electrodes) 2 in the field of view, and the average value for the measurements was regarded as the metal diffusion length.

It is to be noted that the diffusion length of the non-precious metal constituting the external electrode to the internal electrode refers to a value measured by the method mentioned above.

Figure 4:
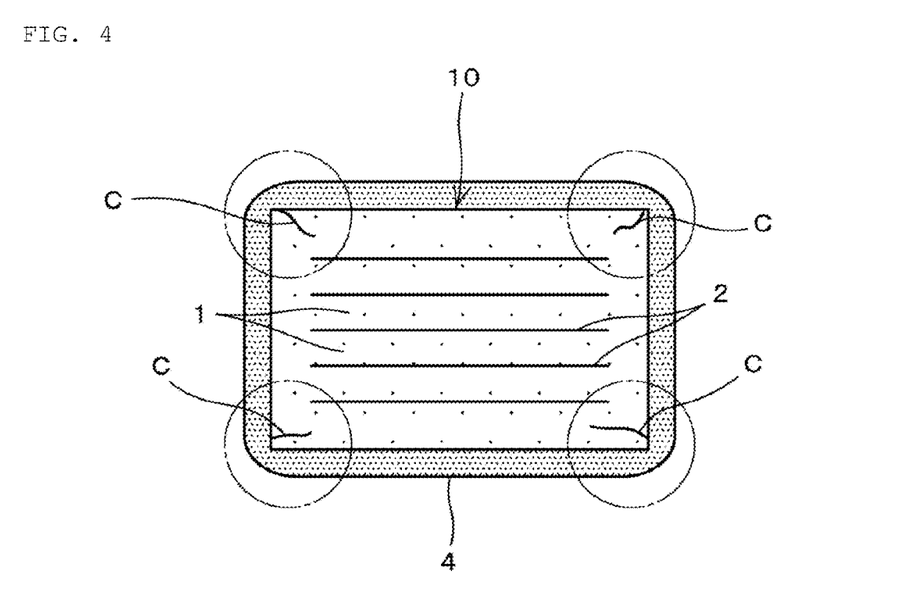
FIG. 4 is a diagram for explaining a method of checking cracks generated at corner parts of a joint interface between an external electrode and an internal electrode exposed by polishing.

In addition, the end surface (surface WT) with the external electrode formed, of the multilayer ceramic capacitor as a completed article, prepared in the way described above, was polished toward the length direction (direction L) to expose the joint interface between the external electrode and the internal electrode. Then, as shown in FIG. 4, attention was focused on corner parts of the exposed joint surface to observe whether cracks C were generated or not. It is to be noted that parts denoted by the same symbols as in FIGS. 1 and 2 refer to the same parts in FIG. 4.

The results are shown in Table 3.

internal electrode is less than 1 μm. Furthermore, in the case of the sample of sample number 1, it has been confirmed that the targeted electrostatic capacitance is not able to be ensured with unsatisfactory moisture resistance and inadequate contact between the external electrode and the internal electrode.

On the other hand, in the case of the samples of sample numbers 2 to 5, it has been confirmed that increasing the firing temperature to 700 to 850° C. forms an interfacial glass layer to increase the metal diffusion length (Cu→Ni diffusion length), and thus fulfill moisture resistance while fulfilling electrostatic capacitance.

However, in the case of the sample of sample number 6 obtained at the firing temperature of 900° C., it has been confirmed that the multilayer ceramic element 10 has crack C generated as schematically illustrated in FIG. 4, with excessive diffusion of the Cu consisting the external electrodes to the Ni constituting the internal electrodes.

TABLE 3

| | | | WDX Mapping | | | | | | | | |
|---|---|---|---|---|---|---|---|---|---|---|---|
| | | | Composition of Main Glass Component (mol %) | | | | | Cu → Ni Diffusion | | | | |
| Sample Number | Type of Conductive Paste | Firing Temperature (° C.) | $SiO_2$ | SrO | BaO | SrO + BaO | Interfacial Glass Layer | Length (μm) | Crack Generated | Electrostatic Capacitance | Moisture Resistance | Determination |
| 1* | D | 650 | 13 | — | 38 | 38 | X | <1 | No | X | — | X |
| 2 | D | 700 | 14 | — | 38 | 38 | ○ | 1 | No | ○ | ○ | ○ |
| 3 | D | 750 | 13 | — | 36 | 36 | ○ | 2 | No | ○ | ○ | ○ |
| 4 | D | 800 | 13 | — | 38 | 38 | ○ | 3 | No | ○ | ○ | ○ |
| 5 | D | 850 | 14 | — | 34 | 34 | ○ | 5 | No | ○ | ○ | ○ |
| 6* | D | 900 | 13 | — | 38 | 38 | ○ | 7 | Yes | ○ | ○ | X |
| 7* | A | 800 | 13 | — | 38 | 38 | ○ | 8 | Yes | ○ | ○ | X |
| 8 | B | 800 | 13 | — | 38 | 38 | ○ | 5 | No | ○ | ○ | ○ |
| 9 | C | 800 | 13 | — | 38 | 38 | ○ | 5 | No | ○ | ○ | ○ |
| 10* | E | 800 | 13 | — | 38 | 38 | ○ | 2 | No | X | — | X |
| 11* | F | 800 | 43 | — | 15 | 15 | ○ | 3 | No | X | — | X |
| 12 | G | 800 | 47 | — | 35 | 35 | ○ | 4 | No | ○ | ○ | ○ |
| 13 | H | 800 | 45 | 35 | — | 35 | ○ | 4 | No | ○ | ○ | ○ |
| 14 | I | 800 | 42 | 19 | 19 | 38 | ○ | 3 | No | ○ | ○ | ○ |

*Sample numbers 1, 6, 7, 10, 11 refers to samples that fails to meet the requirements of the present invention.

It is to be noted that in Table 3, the samples of with the sample numbers marked with * refer to samples as comparative examples that fail to meet the requirements of the present invention, whereas the other samples refer to samples according to examples of the present invention that meet the requirements of the present invention.

The samples of sample numbers 1 to 6 in Table 3 are samples with external electrodes formed by firing at different firing temperatures with the use of, as the conductive paste for the formation of external electrodes, the conductive paste D obtained by using the glass powder with the Cu powder of 3.8 μm in average particle size and a BaO content percentage of 34 mol % (Glass Powder 1 in Table 1).

Figure 5:
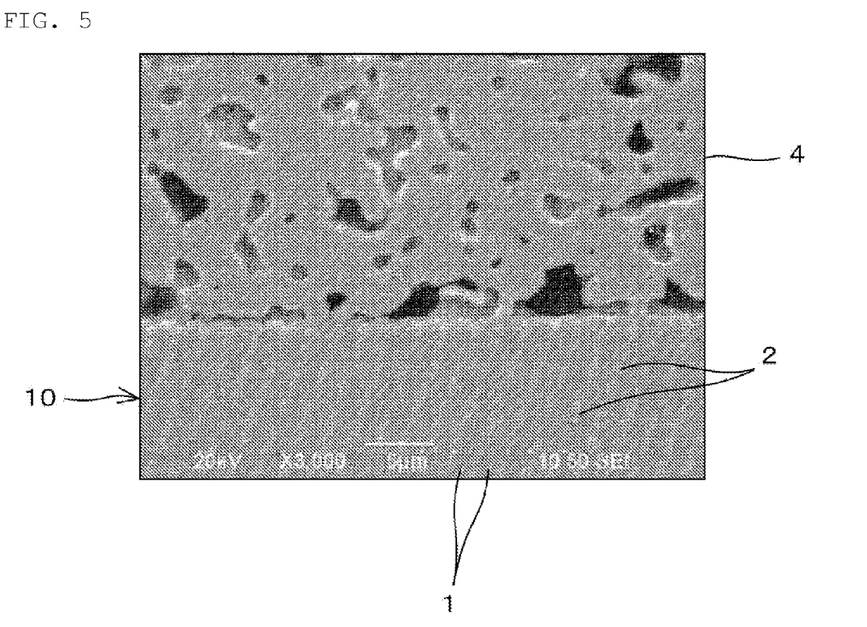
FIG. 5 is a diagram illustrating a polished end surface of a multilayer ceramic capacitor that fails to meet the requirements of the present invention, and showing that any continuous glass layer is not formed at an interface between an external electrode and a ceramic layer.

Further, among the samples of sample numbers 1 to 6, in the case of the sample of sample number 1 subjected to firing at 650° C., with glass insufficiently softened because of the lack of heat quantity, it has been confirmed that any continuous interfacial glass layer is not formed at the interface between the external electrode 4 and the ceramic layer 1 as shown in FIG. 5. It is to be noted that parts denoted by the same symbols as in FIG. 3 refer to the same parts in FIG. 5.

In addition, it has been confirmed that the diffusion length (metal diffusion length) of Cu as a non-precious metal constituting the external electrode to Ni constituting the From the foregoing results, it is determined that the firing temperature for baking the conductive paste to form the external electrodes is desirably adapted to fall within the range of 700 to 850° C. so that the metal diffusion length falls within the range of 1 to 5 μm.

In addition, in the case of the samples of sample numbers 7 to 10 with external electrodes formed by applying the conductive pastes A, B, C, and E prepared by varying the average particle size of the Cu powder with the use of the same glass powder (Glass Powder 1) as used for the samples of sample numbers 1 to 6, and firing the pates at 800° C., it has been confirmed that the ceramic constituting the multilayer ceramic element have cracks generated, with the 8 μm diffusion length (metal diffusion length) of the Cu as a non-precious metal constituting the external electrode to the Ni constituting the internal electrode, in the sample of sample number 7 with the Cu powder of 0.6 μm small in average particle size. This is believed to be because in the case of using the Cu powder which is small in average particle size, the large area of contact with the internal electrodes results in an increased amount of diffusion even with a small quantity of heat.

On the other hand, in the case of the samples of sample numbers 8 and 9 obtained by using the Cu powders of 1.0

μm and 1.8 μm in average particle size, it has been confirmed that favorable results are achieved with the 5 μm diffusion length (metal diffusion length) of the Cu as a non-precious metal constituting the external electrode to the Ni constituting the internal electrode.

In addition, also in the case of the sample of sample number 4 with the Cu powder of 3.8 μm in average particle size, it has been confirmed that favorable results are achieved with the metal diffusion length of 3 μm.

However, in the case of the sample of sample number 10 with the Cu powder of 4.6 μm in average particle size, the metal diffusion length was 2 μm to meet the requirements of the present invention, while the contact is inadequate between the external electrode and the internal electrode. This is believed to be because the large average particle size 4.6 μm of the Cu powder decreases the area of contact between the external electrode and the internal electrode, thereby resulting in inadequate contact.

From the foregoing results, it is determined that it is desirable to use a Cu powder with an average particle size in the range of 1.0 to 3.8 μm in the case of using a Cu powder for the conductive metal powder constituting the conductive paste according to the present invention.

Furthermore, among the samples of sample numbers 4 and 11 to 14 with external electrodes formed under the condition of firing temperature: 800° C. with the use of the conductive pastes D, F, G, H, and I containing the glass powders of different compositions with the Cu powder of 3.8 μm in average particle size, in the case of the sample of sample number 11 being 16 mol % in the total of BaO+SrO in the glass (that is, the sample which fails to meet the requirement of 34 mol % or more in the total of BaO+SrO within the scope of the present invention), it has been confirmed that electrostatic capacitance is not able to be ensured, thereby resulting in unfavorable results.

This is because, with the low proportion of BaO+SrO in the glass being 16 mol %, the dissolution of the joint between the external electrode and the internal electrode in the glass layer in the firing process results in inadequate contact between the external electrode and the internal electrode.

On the other hand, in the case of the samples of sample numbers 12 to 14 which meet the requirement of 34 mol % or more in the total of BaO+SrO, electrostatic capacitance was able to be ensured.

Furthermore, in the case of the samples of sample numbers 12 to 14 with $SiO_2$ in the glass in the range of 42 to 47 mol %, without any crack generated decreased moisture resistance was not observed either. It is to be noted that in the case of the samples of sample numbers 12 to 14 with $SiO_2$ in the glass in the range of 42 to 47 mol %, the $SiO_2$ content is high in the glass constituting the external electrode, thus making it possible to provide a highly reliable multilayer ceramic capacitor which has external electrodes with plating resistance improved, highly responds to variation in the film thickness of the external electrode, variation in plating time, etc, and allows the margin against decreased moisture resistance to be ensured adequately.

From the foregoing results, it is determined that meeting the requirements of the present invention makes it possible to reliably provide a highly reliable multilayer ceramic capacitor which can achieve targeted electrostatic capacitance with internal electrodes and external electrodes reliably connected, has excellent moisture resistance, and can keep a ceramic constituting a ceramic element from being cracked due to metal diffusion from the external electrodes to the internal electrodes, even when non-precious metals are used for the internal electrodes and the external electrodes.

In addition, the method for manufacturing a multilayer ceramic capacitor according to the present invention makes it possible to reliably manufacture a multilayer ceramic capacitor which can produce the function effects.

It is to be noted that while a case of Ni for the non-precious metal material constituting the internal electrodes and Cu for the non-precious metal constituting the external electrodes has been described as an example in the foregoing embodiment, it is possible to use, as the non-precious metal constituting the internal electrodes, oxide-coated Ni, Al, etc. besides Ni, and it is possible to use, as the non-precious metal constituting the external electrodes, oxide-coated Cu, CuSn alloys, CuNi alloys, etc. besides Cu.

In addition, while the ceramic material mainly containing a barium titanate is used as a material constituting the ceramic layers as dielectric layers in the foregoing embodiment, the material constituting the ceramic layers as dielectric layers is not to be considered limited to the foregoing in the present invention, but it is possible to use a ceramic material mainly containing a calcium zirconate, and the like.

It is to be noted that the present invention is not to be considered limited to the embodiment described above, but various applications and modifications can be made within the scope of the invention in regard to the layer numbers of the dielectric layers and internal electrodes constituting the multilayer ceramic element, etc.

DESCRIPTION OF REFERENCE SYMBOLS 1 ceramic layer
2 (2a, 2b) internal electrode
3 (3a, 3b) end surface of multilayer ceramic element
4 (4a, 4b) external electrode
10 multilayer ceramic element
11 Ni plating film layer
12 Sn plating film layer
G glass layer
L length of multilayer ceramic element
T thickness of multilayer ceramic element
W width of multilayer ceramic element

The invention claimed is:
1. A multilayer ceramic capacitor comprising:
a multilayer ceramic element having internal electrodes opposed to each other with dielectric ceramic layers interposed therebetween; and
external electrodes on a surface of the multilayer ceramic element and electrically connected to the internal electrodes, wherein:
(a) the external electrodes contain a first non-precious metal as a first conductive component; and the external electrodes contain a glass containing BaO and/or SrO, a total content of the BaO and/or the SrO is 34 mol % or more with respect to a total amount of the glass included in the external electrodes, the glass included in the external electrodes contains $SiO_2$ in a range of 42 mol % to 47 mol % with respect to the total amount of the glass in the external electrodes, and the glass included in the external electrodes forms a glass layer at interfaces between the dielectric ceramic layers and the external electrodes;
(b) the internal electrodes contain, as a second conductive component, a second non-precious metal different from the non-precious metal in the external electrodes; and

(c) the first non-precious metal is diffused into the internal electrodes at joints between the external electrodes and the internal electrodes, and a diffusion length thereof is within a range of 1 μm to 5 μm from joint interfaces between the external electrodes and the internal electrodes at the joints.

2. The multilayer ceramic capacitor according to claim 1, wherein the first non-precious metal is a Cu-based material.

3. The multilayer ceramic capacitor according to claim 2, wherein the first non-precious metal has an average particle size of 1.0 μm to 3.8 μm.

4. The multilayer ceramic capacitor according to claim 1, wherein the first non-precious metal has an average particle size of 1.0 μm to 3.8 μm.

5. The multilayer ceramic capacitor according to claim 2, wherein the second non-precious metal is a Ni-based material.

6. The multilayer ceramic capacitor according to claim 1, wherein the second non-precious metal is a Ni-based material.

7. A method for manufacturing a multilayer ceramic capacitor, the method comprising:
   forming external electrodes on a multilayer ceramic element having internal electrodes opposed to each other with dielectric ceramic layers interposed therebetween by applying to the multilayer ceramic element a conductive paste containing:
   (a) a first non-precious metal powder of 1.0 μm to 3.8 μm in average particle size; and
   (b) a glass powder containing BaO and/or SrO, where a total content of the BaO and/or the SrO is 34 mol % or more with respect to a total amount of the glass powder, and wherein the glass powder contains $SiO_2$ in a range of 42 mol % to 47 mol % with respect to the total amount of the glass powder; and
   firing the multilayer ceramic element having the conductive paste applied thereto at 700° C. to 850° C.

8. The method for manufacturing a multilayer ceramic capacitor according to claim 7, wherein the first non-precious metal is a Cu-based material.

9. The method for manufacturing a multilayer ceramic capacitor according to claim 8, wherein the first non-precious metal has an average particle size of 1.0 μm to 3.8 μm.

10. The method for manufacturing a multilayer ceramic capacitor according to claim 7, wherein the first non-precious metal has an average particle size of 1.0 μm to 3.8 μm.

11. The method for manufacturing a multilayer ceramic capacitor according to claim 8, wherein the internal electrodes contain a second non-precious metal that is a Ni-based material.

12. The method for manufacturing a multilayer ceramic capacitor according to claim 7, wherein the internal electrodes contain a second non-precious metal that is a Ni-based material.

* * * * *